US010932223B2

(12) United States Patent
Singh (10) Patent No.: US 10,932,223 B2
(45) Date of Patent: Feb. 23, 2021

(54) REDUCING PING-PONG WHEN OBSERVING MIXED SERVING CELL TYPES

(71) Applicant: Apple Inc., Cupertino, CA (US)

(72) Inventor: Ajoy K. Singh, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/611,640

(22) Filed: Jun. 1, 2017

(65) Prior Publication Data

US 2018/0352486 A1    Dec. 6, 2018

(51) Int. Cl.
| | | |
|---|---|---|
| H04W 36/00 | (2009.01) | |
| H04W 74/08 | (2009.01) | |
| H04W 68/00 | (2009.01) | |
| H04W 36/24 | (2009.01) | |
| H04W 28/08 | (2009.01) | |
| H04W 76/16 | (2018.01) | |
| H04W 84/12 | (2009.01) | |
| H04W 36/14 | (2009.01) | |
| H04W 76/11 | (2018.01) | |

(52) U.S. Cl.
CPC ......... *H04W 68/005* (2013.01); *H04W 28/08* (2013.01); *H04W 36/00837* (2018.08); *H04W 76/16* (2018.02); *H04W 36/0022* (2013.01); *H04W 36/14* (2013.01); *H04W 76/11* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 1,001,507 | A * | 8/1911 | Cox ....................... | B65H 29/46 |
| | | | | 101/47 |
| 8,682,327 | B2 | 3/2014 | Tenny et al. | |
| 2004/0102167 | A1* | 5/2004 | Shim ..................... | H04B 17/23 |
| | | | | 455/226.2 |

(Continued)

OTHER PUBLICATIONS

3rd Generation Partnership Project; Technical Specification Group Services and System Aspects; Study on General Packet Radio Service (GPRS); Tunelling Protocol (GTP) based S2b; Stage 2 (Release 10); 3GPP TR 23.834 V10.0.0; Jun. 2010; 20 pgs.

(Continued)

*Primary Examiner* — Kevin C. Harper
*Assistant Examiner* — Derrick V Rose
(74) *Attorney, Agent, or Firm* — Dickinson Wright RLLP (57) ABSTRACT

Signal load due to ping-pong of a wireless device between a wireless local area network (WLAN) access point (AP) and a cellular base station is reduced. The wireless device operates in a geographic region with signal coverage from more than one radio access technology (RAT) type of cellular serving cell as well as potentially coverage from the AP. An IP address used for incoming calls and the RAT serving the wireless device are part of a context. In some instances, when the wireless device changes context from the AP to a cellular base station and back to the AP ("ping-pong"), the context changes and a new IP address may be obtained via network signaling. Ping-pong is reduced by determining a quality estimate of cellular signals that relies on cell measurements from a mix of cellular base stations, where the mix of cellular base stations supports different cellular RATs.

20 Claims, 7 Drawing Sheets

(56) References Cited

U.S. PATENT DOCUMENTS

| | | | |
|---|---|---|---|
| 2007/0072609 A1* | 3/2007 | Qiao | H04W 36/30 |
| | | | 455/436 |
| 2007/0230401 A1 | 10/2007 | Rayzman et al. | |
| 2011/0256869 A1* | 10/2011 | Zhang | H04W 24/02 |
| | | | 455/435.2 |
| 2013/0017805 A1 | 1/2013 | Andre-Jonsson et al. | |
| 2013/0040693 A1* | 2/2013 | Chen | H04W 36/14 |
| | | | 455/525 |
| 2014/0057632 A1* | 2/2014 | Hole | H04W 36/30 |
| | | | 455/436 |
| 2017/0201911 A1* | 7/2017 | Ng | H04W 36/0022 |

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 12); 3GPP TS 36.304 V12.0.0; Mar. 2014; 34 pgs.

VoLTE Service Description and Implementation Guidelines; Version 1.1; GSM Association; Official Document FCM.01; Mar. 26, 2014; 121 pgs.

* cited by examiner

REDUCING PING-PONG WHEN OBSERVING MIXED SERVING CELL TYPES

FIELD

The described embodiments relate generally to multiple access wireless communications using electronic devices, including systems and techniques for reducing ping-pong of context when observing mixed serving cell types.

BACKGROUND

A mobile network operator (MNO) may deploy more than one network in a given geographic area. For example, signals from different cellular radio access technologies (RATs) may be visible to a given wireless device (also referred to herein as a device or a mobile device). The different cellular RATs can include LTE high-band, LTE mid-band, LTE low-band, UMTS, and GSM. Each cellular RAT is supported by corresponding equipment; this equipment is referred to herein as a base station. The base stations may be co-located, e.g., LTE high-band, LTE mid-band, LTE low-band, UMTS and GSM base stations may be associated with the same given radio tower. As well as the cellular RATs, the wireless device may also observe a Wi-Fi signal.

In order to be able to receive incoming calls, the wireless device may register with a server, such as an internet multimedia subsystem (IMS) server. Camping is the communication activity of collecting system information from a base station of a particular RAT and being available for incoming calls. The particular RAT may be a cellular RAT or a Wi-Fi RAT. The wireless device may obtain an IP address from a packet data network gateway (PDN-GW). To allow an incoming call to be reached for an incoming call, a wireless device may register the IP address with an IMS server so that the IMS server has information indicating that the mobile device should be reached at the IP address by the particular RAT. A context includes the nature of the particular RAT (cellular or Wi-Fi) and the IP address. A change by the wireless device from first camping on a Wi-Fi AP to a cellular base station and back to the Wi-Fi AP is referred to herein as ping-pong. Ping-pong causes a signal load in terms of establishing an IP address for the wireless device because of the context change.

The Third Generation Partnership Project (3GPP) standards development organization has developed and continues to develop a set of standards referred to as Long Term Evolution (LTE). Some embodiments disclosed herein are illustrated with respect to the 3GPP LTE standards. Further details of LTE standards can be found in i) "User Equipment (UE) procedures in idle mode," 3GPP 36.304, March 2014 (hereinafter "3GPP 36.304"), ii) "Tunneling Protocol (GTP) based S2b," 3GPP TR 23.834, June 2010 (hereinafter "3GPP 23.834"), iii) "Network Architecture," 3GPP TS 23.002, September 2010 (hereinafter "3GPP 23.002"), and iv) "User Equipment (UE) radio transmission and reception", 3GPP TS 36.101, March 2017 (hereinafter "3GPP 36.101").

Some embodiments disclosed herein are illustrated with respect to voice over LTE ("VoLTE"), which makes use of the Internet Multimedia Subsystem (IMS). Further details of IMS and VoLTE can be found in GSMA FCM.01 "VoLTE Service Description and Implementation Guidelines," version 1.1, Mar. 26, 2014 (hereinafter "GSMA VoLTE Description").

In general, a base station tower may be used by an MNO to operate one or more sectors, using directional antennas. A common arrangement is to use antennas with a 120 degree beam pattern and maintain three sectors from a single tower at a given frequency band. From the point of view of the MNO, a cell is a geographic region served by one base station or one sector. The signals observed in that geographic region, from the point of view of a UE, may be referred to as a cell.

A base station in an LTE system is generally referred to as an eNodeB. A base station in a Wi-Fi system is generally referred to as an access point (AP).

In general, when a device boots up, it evaluates cellular link quality. If the quality is good, then the device camps on the observed cell, which is then the cellular serving cell. An example of a quality estimate that qualifies as good is that of observing more than one signal bar value. Another example of a quality estimate is a reference signal received power (RSRP) value, a received signal strength indicator (RSSI) value, a signal to interference plus noise ratio (SINR) value, or a signal to noise ratio (SNR) value. Further background on camping, and cell selection, including use of RSRP values, can be found in 3GPP 36.304.

A signal bar value is a measure of the observed signal, particularly of power statistics of the observed signal. The signal bar value can be, for example, an RSSI value, an SNR value, an SINR value, or an RSRP value. Each wireless device manufacturer determines their own definition of the translation between power statistics and the number of signal bars displayed on a screen of a wireless device to a user.

SUMMARY

Representative embodiments set forth herein disclose various systems and techniques for reducing ping-pong when more than one cellular serving cell type is visible to a wireless device. That is, the device observes a mix of cellular RAT types. In some embodiments, rather than determining link quality based on observations of a single serving cell RAT type, an inter-RAT (iRAT) manager algorithm uses a moving average over samples derived from two or more cellular RAT base stations. The iRAT manager makes ongoing measurements of power statistics. These power statistics are mapped or transformed into samples such as values of RSSI, SNR, SINR, or RSRP, for example.

In a cellular-preferred scenario, the iRAT manager keeps the wireless device camped on a cellular RAT if the quality is sufficient. If the cellular quality is not good and Wi-Fi quality is good, then the iRAT manager switches the device to camping on Wi-Fi. Whether a sample represents good quality can be determined by comparing with a threshold established for that type of sample (e.g., GSM RAT, Wi-Fi RAT, LTE low-band RAT, etc.).

The iRAT manager module (software or hardware) uses metrics such as samples based on power statistics to support MNO-specific policies such as Wi-Fi preferred, or cellular preferred. In a mixed scenario, a cellular-preferred configuration can result in obtaining service on a first base station supporting a first cellular RAT type at a first time, and obtaining an internet protocol (IP) address for registration purposes. The device may then be shifted at a second time to a second base station supporting a second cellular RAT type. The shifting can be commanded by an MNO providing service with the first and second base stations. The shifting can be based on, for example, time-varying load-balancing goals of the MNO. For example, many devices may be obtaining service on the first cellular RAT, and the MNO may seek to shift, at the second time, some devices to the second cellular RAT to reduce inter-user interference on frequencies associated with the first cellular RAT. Alternatively or in addition, the MNO may prioritize the second cellular RAT over the first cellular RAT. Thus, the device may move from the first cellular RAT to the second cellular RAT based on MNO priorities.

However, if the power statistics are rapidly varying, the device may begin to camp on Wi-Fi at a third time instead of remaining on the second cellular RAT. This is a change of context and the device may acquire a new IP address and register again. In prior solutions, the device camping on Wi-Fi may determine that conditions are good on the first cellular RAT and begin camping there at a fourth time, resulting in another change of context. This collection of shifts is referred to as ping-pong when it occurs with the span of some tens of seconds, e.g., 30-90 seconds. Changes of context result in signal load at the network, and should be avoided if the changes are unnecessary.

Embodiments provided herein reduce ping pong by determining a quality estimate that is based on the observed mix of cellular RAT types; a generally heterogeneous pool of samples is used to determine a cellular quality estimate. In the example above, power statistics of the second cellular RAT are reflected in the quality estimate in embodiments presented herein. When the device is camping on Wi-Fi, beginning at the third time, the quality estimate provided herein will reflect the weakness of the second cellular RAT and the device will stay somewhat longer on Wi-Fi because the quality estimate based on heterogeneous samples does not satisfy a threshold. Thus, ping pong is reduced and the number of changes of context is reduced.

In embodiments presented herein, rather than evaluating a cellular link based on instantaneous quality of a serving cell, a moving average over a heterogeneous pool of samples is performed to produce a quality estimate. A device operating under a cellular-preferred regime will only switch from Wi-Fi to cellular if the moving-average-based quality estimate exceeds a threshold. For example, if a serving cell type for the device changes from LTE to UMTS to GSM, the moving average algorithm calculates a combined score based on samples captured within a time window. In some embodiments, quality estimate is based on the quality of each link (LTE, UMTS, GSM) as well as the duration of observation of each link.

This Summary is provided merely for purposes of summarizing some embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

System

Figure 1:
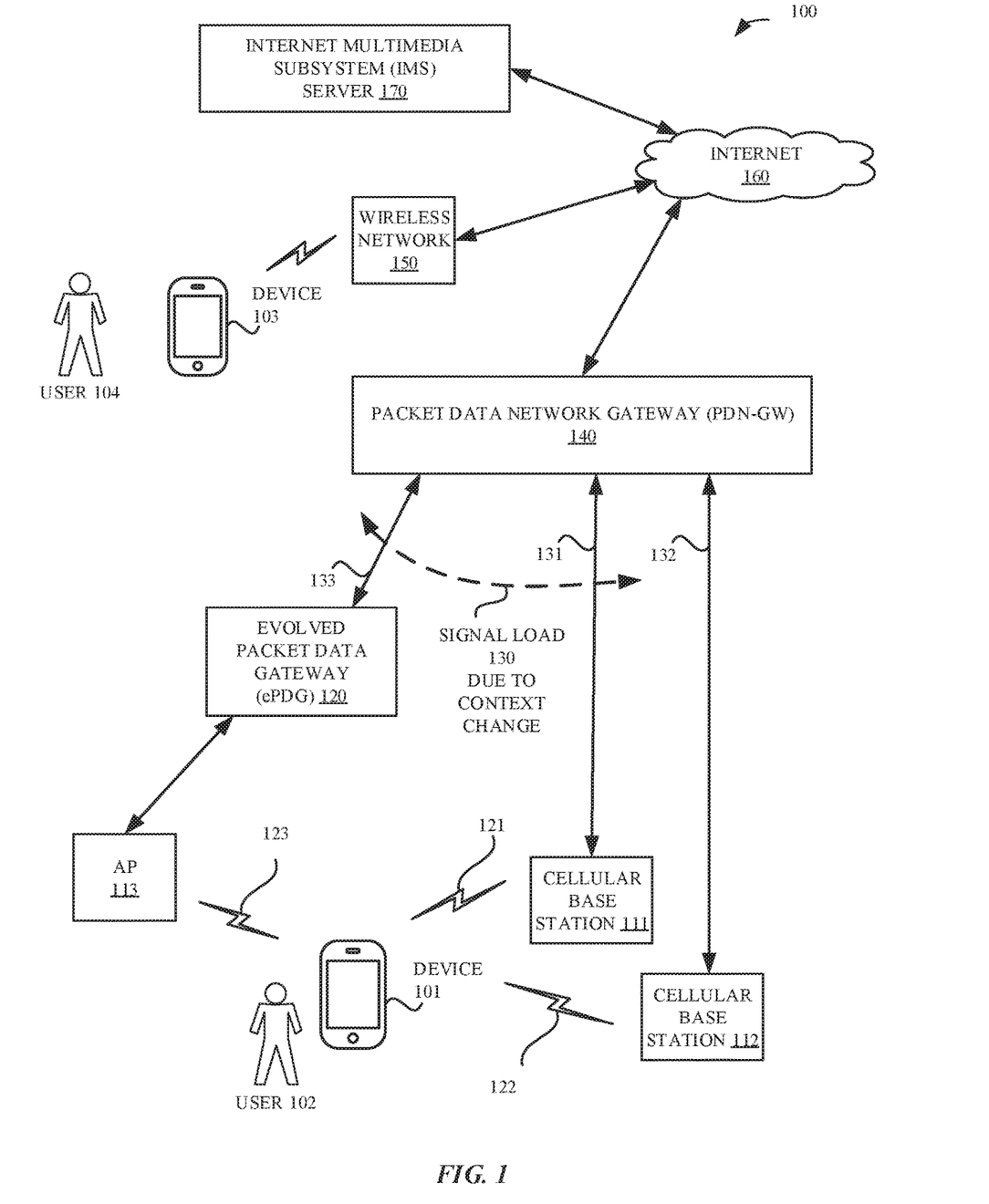
FIG. 1 illustrates an exemplary system including users, wireless devices, base stations, gateways and servers, according to some embodiments.

FIG. 1 illustrates a device 101 associated with a user 102. Exemplary device 103 and user 104 are also illustrated. Device 103 is shown to connect to Internet 160 through a wireless network 150. In some instances, a call or other communication originating at device 103 may be received by device 101. From the point of view of device 101, this is an incoming call. In some embodiments, device 101 registers with IMS server 170 so that device 101 can be reached by the incoming call. Further details of network attach and registration can be found in the GSMA VoLTE Description.

Device 101 camps on a wireless signal. Wireless signals, represented as zig-zag links to the device 101, are shown from an AP 113, a cellular base station 111, and a cellular base station 112. Power statistics are indicated by the reference numerals 123, 121, and 122 associated with the links from the AP 113, the cellular base station 111, and the cellular base station 112, respectively. In general, the AP is referred to as a base station. The device 101 may camp on any of the base stations (AP 113, cellular base station 111, or cellular base station 112). In general, there may be more than two cellular base stations. The overall collection of parties, equipment, and networks is referred to as system 100.

Device 101 observes a mix of serving cell types. Cellular base station 111 may be associated with, for example, an LTE low-band RAT, an LTE mid-band RAT, an LTE high-band RAT, a UMTS RAT, or a GSM RAT. Further description of LTE bands can be found in 3GPP 36.101. Cellular base station 112 is illustrated as being associated with a different RAT than that of cellular base station 111 (thus the mix), but otherwise representing a RAT from the same set {LTE low-band, LTE mid-band, LTE high-band, UMTS, GSM}. The MNO, in some instances, has a policy indicating a preference that a device camp on a specific LTE band at a geographic location even though other RATs are available to the device.

If a change of context occurs because the device 101 camps on a particular base station, device 101 obtains an IP address and registers with the IMS server 170. Routing of an incoming call depends, in part, on whether the device 101 is camped on AP 113 or camped on a cellular base station.

When device 101 begins camping on AP 113, the device 101 is assisted in attaching to the network by the enhanced packet data gateway (ePDG) 120. In FIG. 1, the ePDG 120 communicates with the PDN-GW 140 by a path 133. The ePDG 120 obtains the IP address from the PDN-GW 140 on behalf of the device 101 and delivers the IP address to the device 101 in an IKEv2 message. IKEv2 is an Internet Engineering Task Force (IETF) protocol used between the device 101 and the ePDG 120 to setup a VPN tunnel with a carrier network. Further description of the use of IKEv2 between a user equipment (UE) such as device 101 and an ePDG, including delivery of an IP address configuration to a UE, can be found in 3GPP 23.834. 3GPP 23.834 also illustrates connection of an ePDG to a PDN-GW. The device 101 registers this IP address with the IMS server 170 so that the device 101 can be reached for incoming calls via the AP 113. Further details on support of Wi-Fi and the role of the ePDG can be found in 3GPP 23.834 and 3GPP 23.002.

The device 101 determines a quality estimate, Q, based on cell power statistic 121 and cell power statistic 122. When Q satisfies a threshold, the device 101 camps on one of the cellular base stations, e.g., cellular base station 111. The device 101 obtains an IP address, that is possibly a new IP address, from the PDN-GW 140 and registers this obtained IP address with the IMS server 170 so that the device 101 can be reached for incoming calls over a cellular base station. The cellular base station 111 and the cellular base station 112 communicate with the PDN-GW 140 via paths 131 and 132, respectively. The PDN-GW 140 can also assign the same IP address to device 101 when the PDN-GW 140 switches path from the ePDG 120 to cellular (e.g., switches from 133 to one of the paths 131 or 132) or vice versa (switches, e.g., from 131 to 133). In those instances that the PDN_GW 140 assigns the same IP address, the PDN-GW 140 will know that device 101 has switched path from AP 113/ePDG 120 (path 133) to cellular radio (the PDN-GW 140 will know that device 101 has switched to, for example, the cellular base station 111 and the path 131) or vice versa (e.g., the device 101 has switched from cellular base station 111/path 131 to AP 113/path 133).

Even when the PDN_GW 140 assigns the same IP address to the device 101, the device 101 registers with the IMS server 170 to notify the IMS server 170 of access network information (notifying that present access is via AP 113 or that present access is via a cellular base station). The IMS server 170 needs the access network information in order to support various services. For example, location information of the user 102 can be used for emergency calling and a variety of applications like location-based barring, differential charging, and location tracking.

A change from path 133 to 131 or from 131 to 133 is a change of context and forms part of the signal load 130 indicated in FIG. 1 by a dashed arrow. If the device makes a context change decision based on only instantaneous measurements of the current serving cell, ping pong can occur. This is partly due to, in some instances, to rapidly changing cellular radio conditions and partly due to MNO influence such as prioritizing a particular cellular RAT or load balancing activities. Using embodiments presented herein, the signal load 130 is reduced because the number of context changes over time is reduced. In general, a new IP address is not needed by the device 101 when changing the base station recognized as serving cell from the cellular base station 111 to the cellular base station 112.

Exemplary Logic

Figure 2:
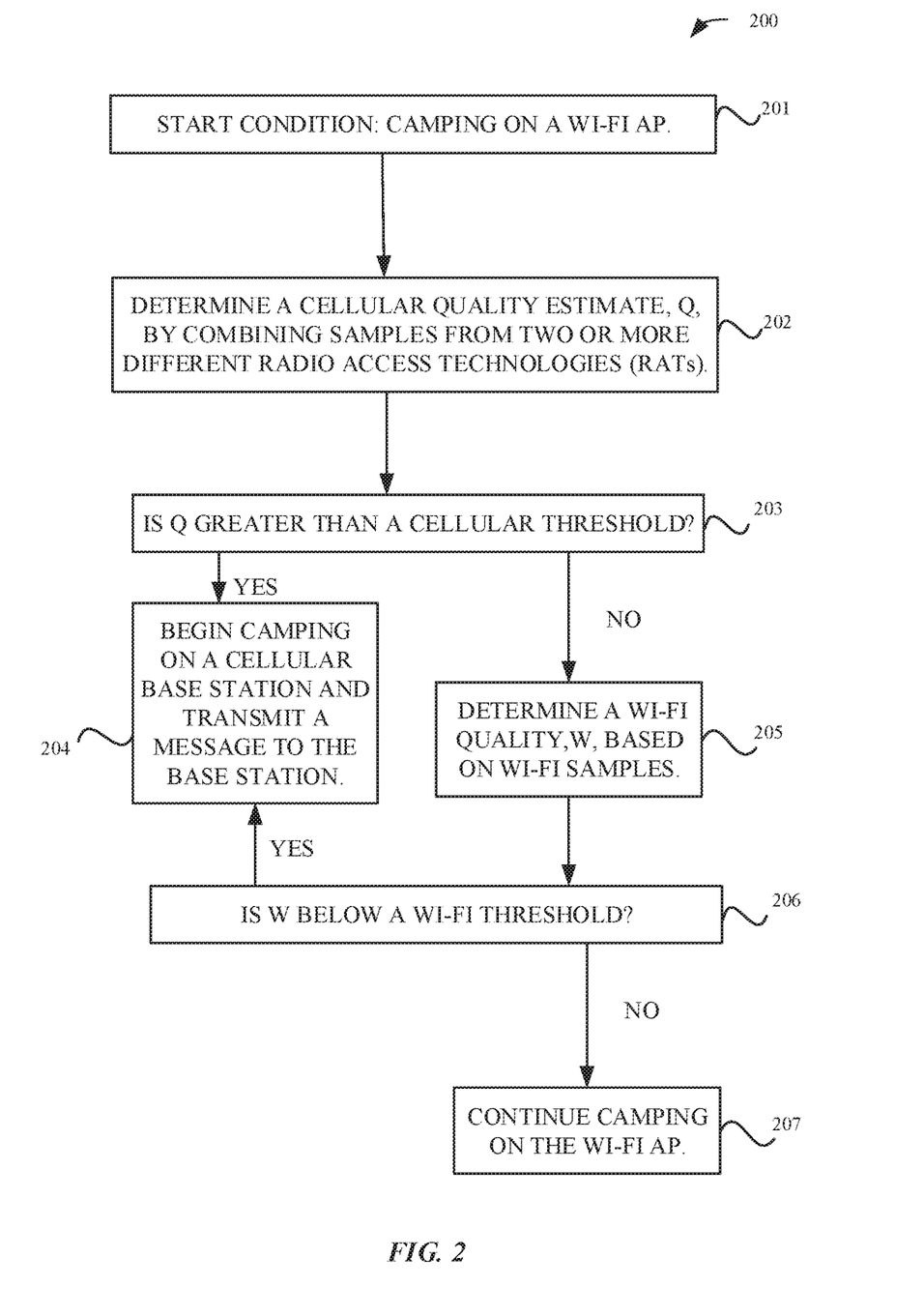
FIG. 2 illustrates exemplary logic for reducing ping-pong, according to some embodiments.

FIG. 2 illustrates exemplary logic 200 for determining a quality estimate and determining whether to begin camping on a cellular base station. Exemplary logic 200 addresses a situation of rapidly varying power statistics and MNO policies and/or MNO load balancing exposing a device to ping pong due to frequent change of context. The problem of ping pong is reduced by forming a quality estimate based on power statistics from more than one RAT type. A heterogeneous pool of samples is formed based on observations of cellular base stations of two or more different RAT types.

At 201, a device is originally camped on a Wi-Fi RAT base station (an AP). At 202, the device determines a quality estimate, Q. Q is based on combining samples from two or more different cellular RAT power statistics, e.g., using a moving average. The moving average generally presents more information about cellular RATs than a measurement based on a homogeneous pool of samples always captured from a single base station. In particular, the moving average includes samples based on measurements of the currently observed cellular base station and generally also includes samples from one or more other cellular base stations observed earlier. At 203, the device determines whether Q satisfies (exceeds) a cellular threshold. If Q exceeds the cellular threshold, then, at 204, the device begins camping on a cellular base station. In some embodiments, arrival at 204 includes the transmission of a message to the base station to initiate a network attach procedure. Because Q is generally based on observing more than one cellular RAT type, ping pong is less likely than a measurement based on only observing one base station type. For example, suppose Q satisfies the threshold and the device camps on a first cellular RAT type, and then the MNO performs load balancing or a policy shifts the device to a second cellular RAT type. The strong Q value means that the associated second cellular RAT base station is more likely to provide adequate link quality than if Q had not sampled over more than one RAT. This is because, in an averaging sense, a power statistic from the second cellular RAT base station tends to be reflected in Q, because the MNO directs the device to measure various RATs. Averaging means sometimes, not necessarily every time.

If Q does not exceed the cellular threshold, then the device determines a Wi-Fi quality, W, based on Wi-Fi samples of Wi-Fi power statistics. Then, at 206, the device compares W to a Wi-Fi threshold, and if W is not below the Wi-Fi threshold, the device continues camping on the Wi-Fi AP. In the outcome where Q does not exceed the threshold, this may occur because some recently-observed cellular RAT was weak. Thus, ping pong is reduced because the device stays on Wi-Fi and avoids a cycle of changing to a cellular RAT that either changes rapidly due to radio conditions or bouncing (due policy or load balancing) to a second cellular RAT where it turns out power statistics are weak. If W is below the Wi-Fi threshold, then the device, at 204, begins camping on a cellular base station. Using embodiments presented herein, the logic flow from 203 through 205 and 206 to 207 is increased and some changes of context are avoided.

Power Statistics and Heterogeneous Pool of Samples

Figure 3:
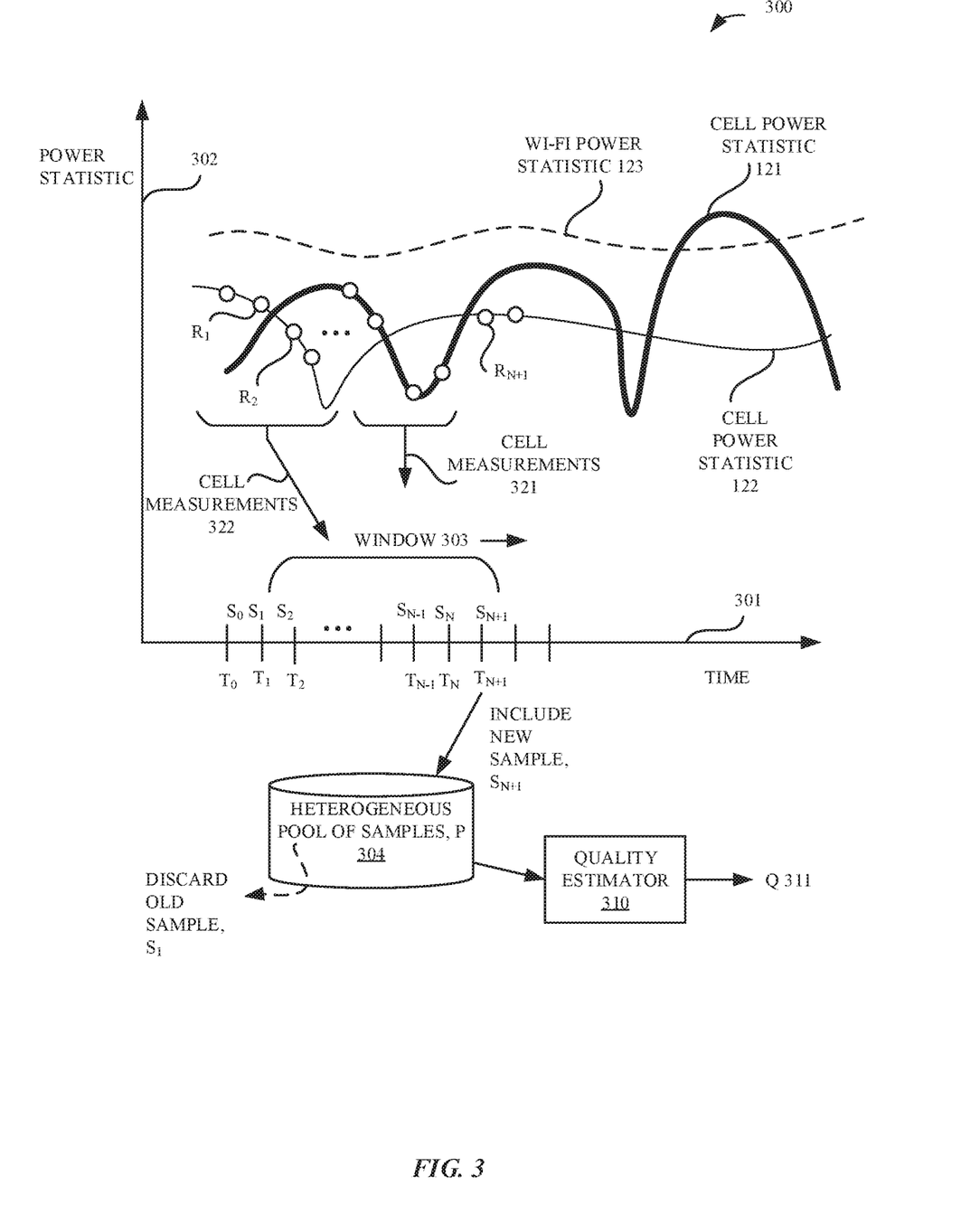
FIG. 3 illustrates exemplary power statistics versus time and collection of a heterogeneous pool of samples, according to some embodiments.

FIG. 3 illustrates a graph 300, a heterogeneous pool of samples 304 and a quality estimator 310. The axes of the graph include a time abscissa 301 and a power statistic ordinate 302. Exemplary power statistic waveforms are shown. FIG. 3 provides, schematically, the potentially rapidly varying nature of cellular power statistics in contrast to a Wi-Fi power statistic. In particular a dashed line represents a Wi-Fi power statistic 123 based on signals transmitted by the AP 113. The heavy line represents a cell power statistic 121 based on signals transmitted by the cellular base station 111. The solid (not heavy) line represents a cell power statistic 122 based on signals transmitted by the cellular base station 112.

Measurements are indicated by the letter R with a subscript indicating a time at which the measurement was made. The device 101 converts or transforms the measurements into samples. Samples are represented as a letter S with a time subscript corresponding to that of the measurement from which they arose. Exemplary measurements of the cellular power statistics are indicated by open bubbles on the cell power statistic 121 and on the cell power statistic 122. Measurements of the cellular base station 112 are referred to collectively in the figure as cell measurements 322 and include annotated measurements R1, R2, and RN+1. Measurements of the cellular base station 111 are referred to as cell measurements 321. At time TN, the MNO directs the device 101 to stop collecting measurements of cellular base station 111 and begin making measurements of cellular base station 112. RN+1 of cell power statistic 122 is the first measurement that device 101 makes after this MNO command. The device 101 also collects measurements of the Wi-Fi power statistic 123; such Wi-Fi measurements do not form part of the heterogeneous pool of samples 304.

The cell measurements may be converted or mapped into samples. For example, power measurements may be converted into power ratio sample values, such as SNR samples or SINR samples. Power measurements may be converted into RSSI samples, for example, by averaging. Also, measurements may be converted into bar-values.

After the conversion or mapping, a set of samples is available. The time between samples, for example the time T1–T0, is 5 seconds in some embodiments. In FIG. 3, samples are indicated associated with times on the 301 axis. Sample values S0, S1, S2, . . . , SN−1, SN, SN+1 are indicated in FIG. 3.

For example, cellular base station 111 may be an LTE-high band RAT base station and cellular base station 112 may be an LTE-low band RAT base station. The cell measurements 322 and corresponding samples, including S1, S2, and SN+1 of FIG. 3, then pertain to the LTE-low band RAT. The cell measurements 321 and corresponding samples, including SN−1, and SN of FIG. 3, then pertain to the LTE-high band RAT.

A window 303 is indicated above the axis 301. The duration of the window, in some embodiments, is 60 seconds. The samples within the window 303 are available as a heterogeneous pool of samples 304 and provide an input to the quality estimator 310. Several exemplary implementations of the quality estimator 310 are given below.

The heterogeneous pool of samples 304 may be represented as a set called P. For example, when the current time moves from the time TN to the time TN+1, the sample S1 can be discarded from the heterogeneous pool of samples 304 and the sample SN+1 can be included in the heterogeneous pool of samples 304. The elements of P at time TN are {S1, S2, . . . , SN−1, SN} and at time TN+1 the elements of P are {S2, S3, SN, SN+1}, wherein the ith element of P is denoted Pi. In some embodiments, the set size N is on the order of 10 to 20. The quality estimator 310, in some embodiments, represents a filter. Several filters can be used. For example, a brickwall filter sums all of the samples found in the heterogeneous pool of samples 304 and provides the sum, possibly normalized by the window length, as the output Q 311. For example, the value of Q 311 at a time Tk computed with a brickwall filter may be expressed as follows:

$$Q_{brick}(T_k) = \frac{1}{N}\sum_{k-i+1}^{N} P_i$$

In order to view the heterogeneous pool of samples 304 in a careful way to avoid changing from Wi-Fi to cellular if one of the cellular RATs has weak power statistics, a worst case estimate of the quality of the mix of cellular observations at a time Tk can be formed as a minimum as shown below:

$$Q_{minimum}(T_k) = \min(P)$$

Depending on how rapidly the power statistics are changing with time, different filters may be used. An alternative filter is one with an exponential decay or forgetting factor, 1−a with 0<a≤1 for filter stability. In this case:

$$Q_{decay}(T_k) = (1-a)Q(T_{k-1}) + aS_k$$

In some embodiments, samples from the window are provided to the quality estimator along with an observed duration. The quality estimator 310 then weights each sample by its associated time duration before summing to produce the quality estimate Q 311. Index values indicating L samples to select from P for the weighted sum are placed in a vector of indices, called "Index(i)" below. The duration to associate with the ith sample is denoted Di. In some embodiments, the Di values are normalized to behave as a histogram or probability density so that $\Sigma D_i = 1$.

$$Q_{weighted}(T_k) = \sum_{i=1}^{L} D_i P_{Index(i)}$$

Figure 4:
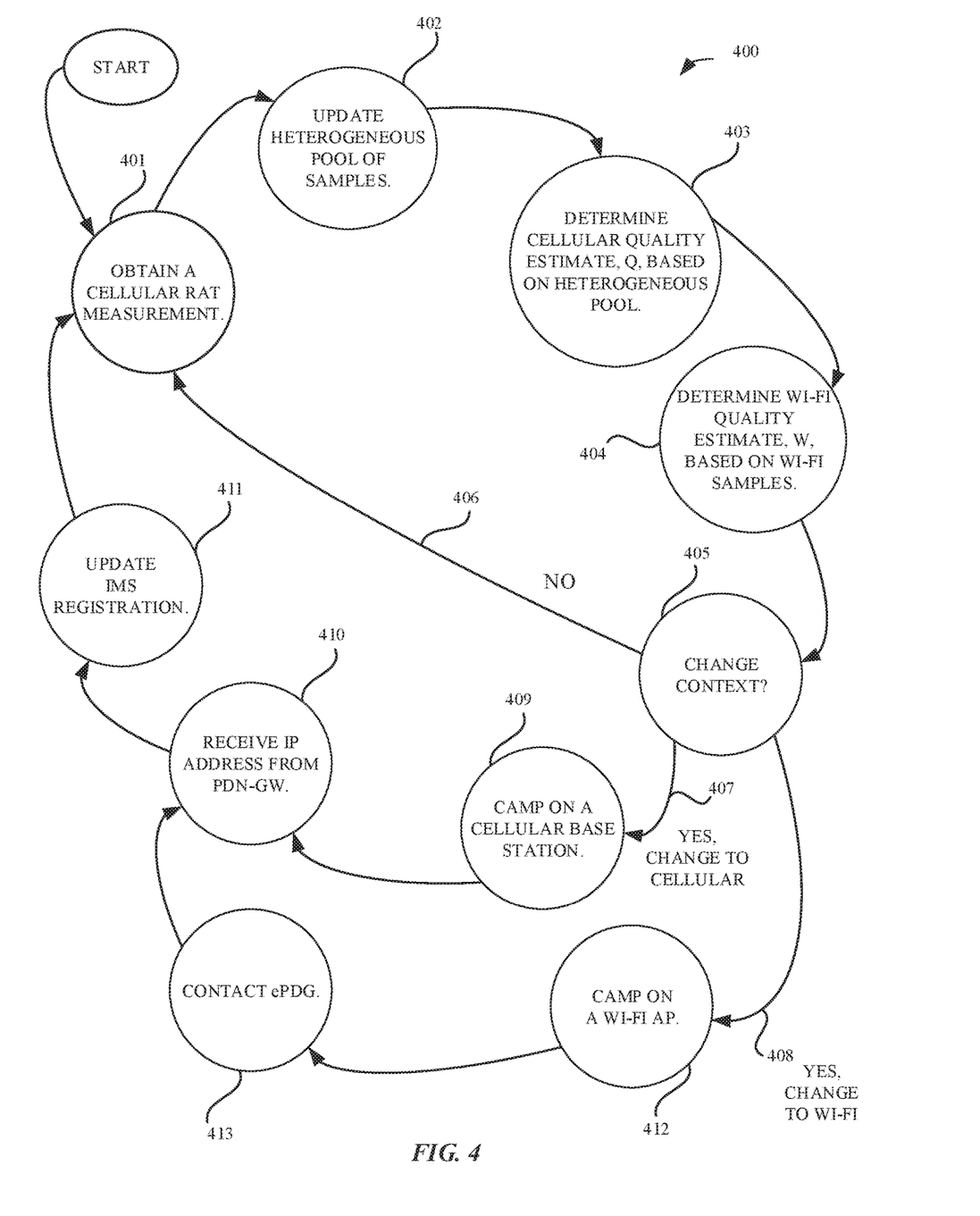
FIG. 4 illustrates an exemplary logic flow including update of IMS registration, according to some embodiments.

The effect of the logic of FIGS. 2 and 4 can be reset in a sense in that the state of the filter represented by quality estimator 310 can be reset to an initial value, such as zero, when the device 101 attaches to a new AP or when the user 102 toggles an airplane mode of the device 101. For example, the elements of the set P can all be set to zero when the device attaches to a new AP or the user toggles airplane mode. When in airplane mode, the cellular transceivers of the device 101 are in powered-down state. Toggling refers to both the events of entering airplane more and of exiting airplane mode.

Logic Flow Including IMS Registration

FIG. 4 illustrates an exemplary logic flow 400 including IMS registration while reducing ping pong when observing mixed serving cell types. At 401, the device obtains a cellular RAT measurement, e.g., RN+1. At 402, the device updates a heterogeneous pool of samples, e.g., the heterogeneous pool of samples 304. In general, the heterogeneous pool of samples includes samples based on power statistics obtained from measuring two or more cellular base stations, each of those cellular base stations supporting a different RAT type. There may be instances in which the entire pool is from one RAT type, but this will be the exception. Embodiments presented herein reduce a rate of ping pong and forming a pool which generally holds samples from different RAT types serves this purpose. At 403, the device determines a cellular quality estimate, Q, based on the heterogeneous pool. This can be done by, for example, the quality estimator 310. Cellular base stations that happen to be providing weak power statistics will influence Q, on the average, toward a low value. Even though an MNO policy or MNO load balancing may shift the device from one cellular RAT to another cellular RAT, if Q is low then the device will favor access via Wi-Fi if the Wi-Fi power statistic is adequate. At 404, the device determines a Wi-Fi quality estimate. This can be based on RSSI samples derived from the Wi-Fi power statistic 123, for example.

At 405, the device determines whether a change of context will occur. Logic 200 of FIG. 2 illustrates a change of context from Wi-Fi to cellular by the transition from 203 to 204. A change of context from cellular to Wi-Fi (transition 408) occurs when: i) the device is originally camped on a cellular base station, ii) the quality estimate Q does not exceed the cellular threshold, and iii) the Wi-Fi quality W is not below the Wi-Fi threshold. If there is no change of context, the logic flows from 405 to 401 and resumes at 401. Using the heterogeneous pool of samples tends to reduce unnecessary changes of context and thus make the transition 406 (no change of context) more likely than if only instantaneous measurements of a serving cell were used.

If, at 405, there is a change of context to Wi-Fi, the logic flows to 412 via transition 408 and the device camps on a Wi-Fi AP, e.g., AP 113. The device then performs a network attach including contacting an ePDG at 413, e.g., ePDG 120. The ePDG allocates or obtains an IP address and provides it to the device as represented by 410. The device then updates its IMS registration, for example, with the IMS server 170, so that the device can be reached by Wi-Fi for incoming calls. The logic then flows to 401 and resumes there.

On the other hand, if there is a change at 405 to a cellular context, then the logic flows via transition 407 to 409 and the device camps on a cellular base station. The device obtains an IP address from a PDN-GW, for example, the PDN-GW 140. The logic then flows to 411 and the device updates the IMS server so that the device can be reached over the cellular network. The logic then resumes from 401.

Some Wireless Device Details

Figure 5A:
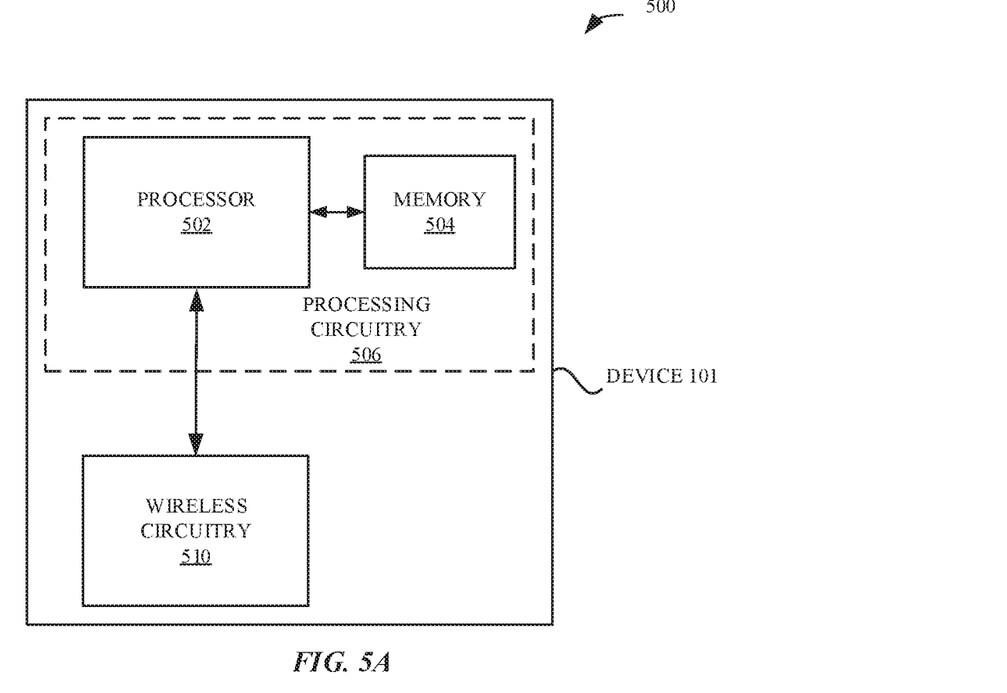
FIG. 5A illustrates exemplary wireless circuitry, processor and memory of a wireless device, according to some embodiments.
Figure 5B:
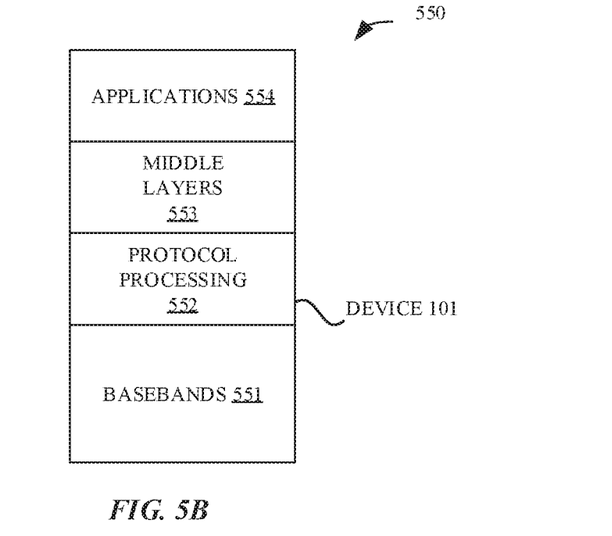
FIG. 5B illustrates an exemplary layer model of the wireless device, according to some embodiments.

FIG. 5A illustrates further detail 500 of the device 101. The device 101 includes wireless circuitry 510 and processing circuitry 506. The processing circuitry 506 includes one or more processors, here represented as a processor 502. The processors communicate with one or more memories, here represented as a memory 504. FIG. 5B illustrates a layer model 550 of the device 101. The layer model includes basebands 551 and protocol processing 552 (e.g., medium access control such as transmission of a random access channel (RACH) message). The protocol processing 552, in some embodiments, performs acquisition of the IP address and registration with the IMS server 170. The basebands 551 and protocol processing 552 provide software and/or hardware components to support one or more RATs. For example, the basebands 551 and protocol processing 552, in some embodiments, support, in addition to, LTE, UMTS, GSM, Bluetooth® and/or Wi-Fi. FIG. 5B illustrates applications 554, supported by middle layers 553, supported by protocol processing 552 and basebands 551. The applications 554, via a user interface, provide functionality to a user. The applications 554 rely on the lower layers to provide data to them.

Figure 6:
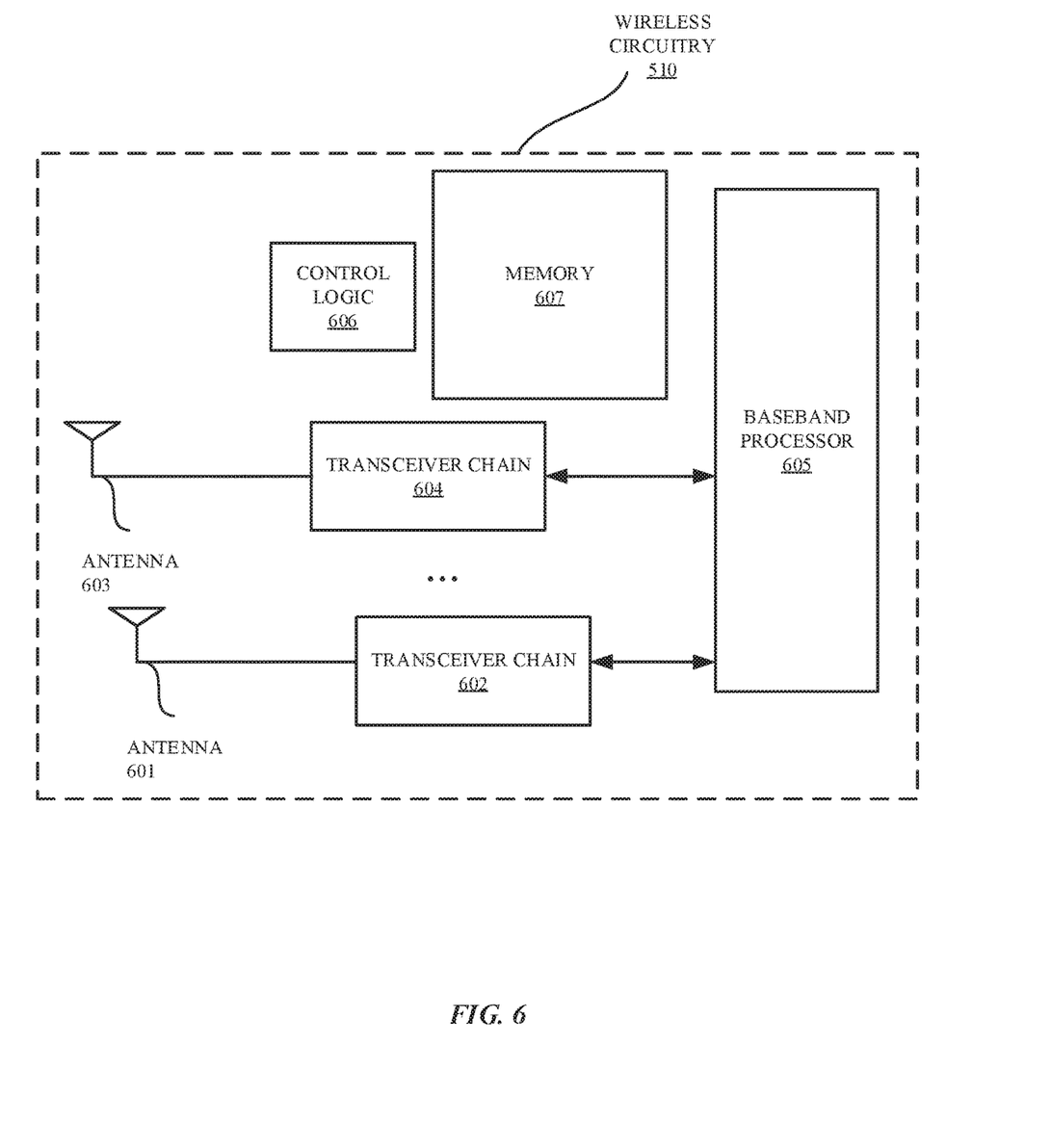
FIG. 6 illustrates further exemplary details of a portion of FIG. 5A, according to some embodiments.

FIG. 6 provides exemplary details of wireless circuitry 510, according to some embodiments. The wireless circuitry includes exemplary antennas 601 and 603 connected to exemplary transceiver chains 602 and 604, respectively. In general, a plurality of transceiver chains (indicated as 602 . . . 604 in FIG. 6) and antennas are provided to allow communication on the multiple RATs described above. Some transceiver chains may share a common antenna. The transceiver chains 602 . . . 604 can be used to support the various RATs discussed herein. The transceiver chains are connected to baseband processor 605. The wireless circuitry also includes control logic 606 and memory 607. The baseband processor 605, in some embodiments, realizes an iRAT manager by performing the logic determining Q and W of FIGS. 2 and 4, maintaining the heterogeneous pool of samples 304, and executing of the quality estimator 310 of FIG. 3. Memory 607, in some embodiments, stores data representing the heterogeneous pool of samples 304 and the cellular quality estimate Q and Wi-Fi quality estimate W for use in the logic of FIGS. 2 and 4. The memory 607 can also represent a non-transitory computer readable medium for storing instructions to be executed by the baseband processor 605 to perform the methods described herein.

Wireless Devices, General Discussion

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known with respect to the transmit and receive antennas. Each transmitted stream corresponds to a particular transmit vector based on a decomposition of a joint channel matrix.

Representative Exemplary Apparatus

Figure 7:
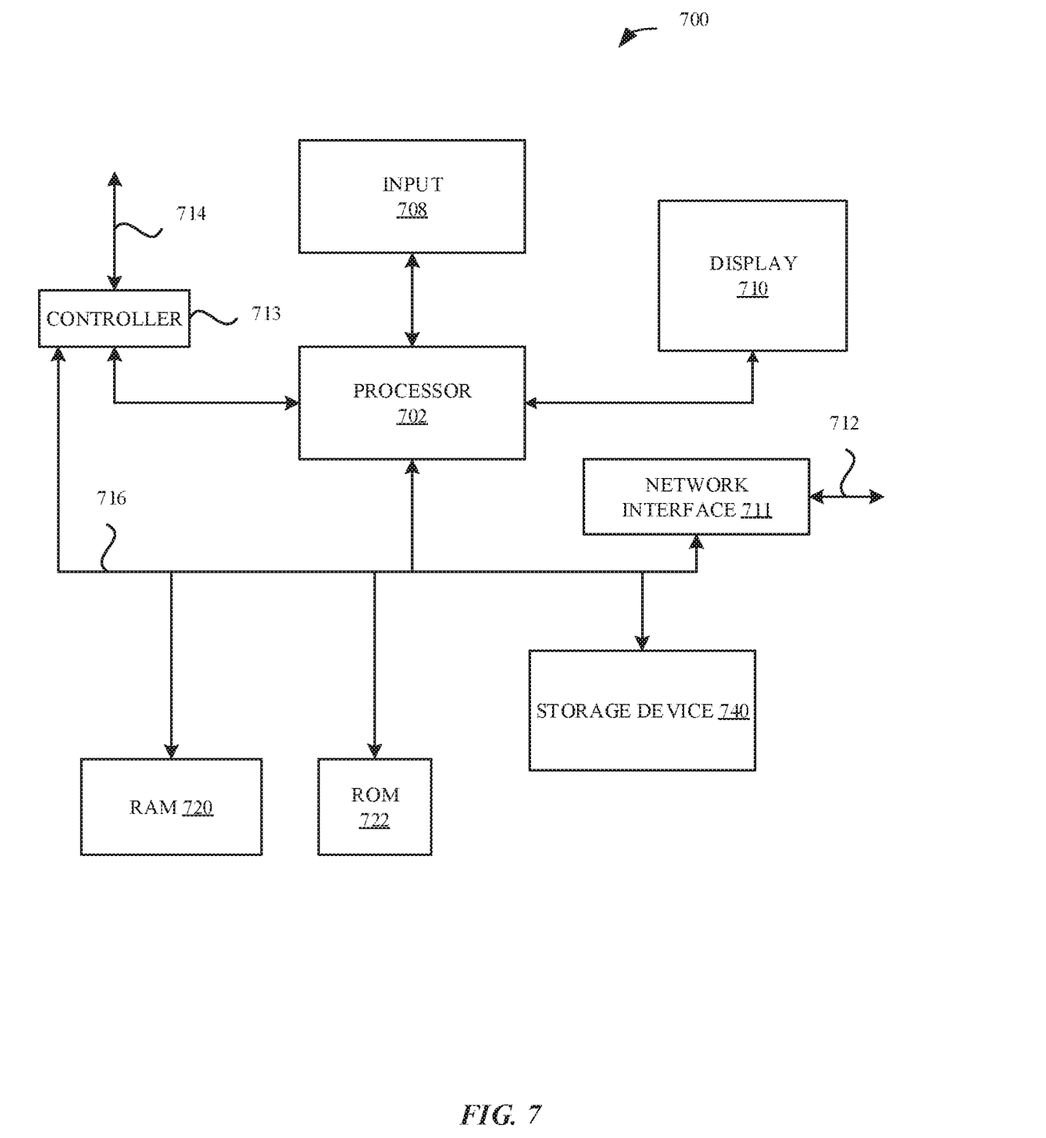
FIG. 7 illustrates an exemplary apparatus for implementation of the embodiments disclosed herein, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the device 101 illustrated in, e.g., FIGS. 1, 8A, 8B, 9, and 10. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user (for example, information relating to incoming, outgoing, or active communication session). A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor.

The computing device 700 also includes a storage device 740, which can comprise a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random Access Memory ("RAM") 720 and a Read-Only Memory ("ROM") 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A method for reducing a number of context switches that occur at a mobile device, the method comprising, at the mobile device:
    determining a quality estimate based on summing together at least a first sample associated with a first base station, the first sample weighted by a first time duration value, and a second sample associated with a second base station, the second sample weighted by a second time duration value, wherein:
        i) the first sample pertains to a first radio access technology (RAT),
        ii) the second sample pertains to a second RAT,
        iii) the first RAT and the second RAT are not the same, and
        iv) the first and second samples are established at respective times that each fall within a particular time window;
    when the quality estimate exceeds a threshold:
        transmitting a message to the first base station; and
    when the quality estimate does not exceed the threshold:
        remaining camped on a third base station associated with a third RAT.

2. The method of claim 1, wherein the first sample is a received signal strength indication (RSSI) value, a reference signal received power (RSRP) value, a signal to noise ratio (SNR) value, or a signal to interference and noise ratio (SINR) value.

3. The method of claim 1, wherein the determining the quality estimate further comprises:
    determining the quality estimate over a pool of samples collected from two or more of a third generation partnership (3GPP) long term evolution (LTE) low-band base station, an LTE mid-band base station, an LTE high-band base station, a universal mobile telecommunications (UMTS) base station, and/or a global system for mobile communication (GSM) base station, wherein each sample in the pool of samples is established at a respective time that falls within the particular time window.

4. The method of claim 1, wherein the first RAT is one of:
    i) a third generation partnership (3GPP) long term evolution (LTE) low-band RAT,
    ii) an LTE mid-band RAT,
    iii) an LTE high-band RAT,
    iv) a universal mobile telecommunications (UMTS) RAT, or
    v) a global system for mobile communication (GSM) RAT.

5. The method of claim 4, wherein the message includes a random access channel (RACH) message.

6. The method of claim 4, further comprising:
    when the quality estimate exceeds the threshold:
        attaching to a packet data network gateway (PDN-GW);
        acquiring an internet protocol (IP) address from the PDN-GW;
        registering with an internet multimedia subsystem (IMS) server using the IP address; and
        receiving, from the first base station, a paging message associated with an incoming voice over LTE (VoLTE) call.

7. The method of claim 1, wherein the third RAT is a wireless fidelity (Wi-Fi) RAT and the third base station is an access point (AP).

8. The method of claim 7, further comprising:
    when the quality estimate does not exceed the threshold:
        receiving, from the AP, a paging message associated with an incoming voice over LTE (VoLTE) call.

9. The method of claim 7, further comprising:
    when i) camping on a second AP, or ii) receiving an instruction to enter or to exit an airplane mode, wherein entering the airplane mode is associated with switching off cellular radio circuits:
        resetting the quality estimate to an initial value.

10. The method of claim 1, wherein the first sample is a number-of-bars value, and the number-of-bars value is based, at least in part, on one or more of a received signal strength indication (RSSI) value, a reference signal received power (RSRP) value, a signal to noise ratio (SNR) value, and/or a signal to interference and noise ratio (SINR) value.

11. The method of claim 10, wherein the number-of-bars value is the lessor of a first number-of-bars value based on the RSRP value and a second number-of-bars value based on the SINR value.

12. The method of claim 1, wherein:
    i) the first sample is included in a first plurality of samples pertaining to the first base station, and
    ii) the second sample is included in a second plurality of samples pertaining to the second base station.

13. The method of claim 12, wherein the first and second plurality of samples are characterized by a time between samples of five seconds.

14. The method of claim 12, wherein updating the quality estimate comprises:
    summing together at least two additional samples with the first and second samples, wherein:
        i) each sample of the at least two samples is associated with a different base station and a different RAT,
        ii) each sample is weighted by a corresponding time duration value; and
        iii) the at least two samples are established respective times that fall within a time window that temporally exceeds the particular time window.

15. The method of claim 14, wherein:
    i) each time duration value corresponds to an observation duration for determining the associated sample; and
    ii) the time duration values used for weighting the samples are normalized to sum to unity.

16. A mobile device comprising:
    a wireless transceiver;
    a memory; and
    one or more processors, wherein the memory includes instructions, that when executed by a processor of the one or more processors, cause the mobile device to perform operations comprising:
        determining a quality estimate based on summing together at least a first sample associated with a first base station, the first sample weighted by a first time duration value, and a second sample associated with a second base station, the second sample weighted by a second time duration value, wherein:
            i) the first sample pertains to a first radio access technology (RAT), ii) the second sample pertains to a second RAT,
iii) the first RAT and the second RAT are not the same, and
iv) the first and second samples are established at respective times that each fall within a particular time window;

when the quality estimate exceeds a threshold:
transmitting, using the wireless transceiver, a message to the first base station; and when the quality estimate does not exceed the threshold:
remaining camped on a third base station associated with a third RAT.

17. The mobile device of claim 16, wherein the first RAT is one of: i) a third generation partnership (3GPP) long term evolution (LTE) low-band RAT, ii) an LTE mid-band RAT, iii) an LTE high-band RAT, iv) a universal mobile telecommunications (UMTS) RAT, or v) a global system for mobile communication (GSM) RAT.

18. The mobile device of claim 17, wherein the third RAT is a wireless fidelity (Wi-Fi) RAT and the third base station is an access point (AP).

19. A non-transitory computer readable medium including instructions that, when executed on a processor of a mobile device, cause the mobile device to perform operations comprising:
determining a quality estimate based on summing together at least a first sample associated with a first base station, the first sample weighted by a first time duration value, and a second sample associated with a second base station, the second sample weighted by a second time duration value, wherein:
i) the first sample pertains to a first radio access technology (RAT),
ii) the second sample pertains to a second RAT,
iii) the first RAT and the second RAT are not the same, and
iv) the first and second samples are established at respective times that each fall within a particular time window;

when the quality estimate exceeds a threshold:
transmitting, using a wireless transceiver of the mobile device, a message to the first base station; and when the quality estimate does not exceed the threshold:
remaining camped on a third base station associated with a third RAT.

20. The non-transitory computer readable medium of claim 19,
wherein the first RAT is one of: i) a third generation partnership (3GPP) long term evolution (LTE) low-band RAT, ii) an LTE mid-band RAT, iii) an LTE high-band RAT, iv) a universal mobile telecommunications (UMTS) RAT, or v) a global system for mobile communication (GSM) RAT, and
wherein the third RAT is a wireless fidelity (Wi-Fi) RAT and the third base station is an access point (AP).

* * * * *